US010924799B2

United States Patent
Renken et al.

(10) Patent No.: US 10,924,799 B2
(45) Date of Patent: Feb. 16, 2021

(54) INSTRUMENT AND METHOD FOR PERFORMING A SWEEP FOR NOISE IN A CABLE NETWORK SYSTEM

(71) Applicant: Viavi Solutions, Inc., San Jose, CA (US)

(72) Inventors: Thomas R. Renken, Greenwood, IN (US); Gregory W. Massey, Greenfield, IN (US)

(73) Assignee: VIAVI SOLUTIONS, INC., San Jose, CA (US)

( * ) Notice: Subject to any disclaimer, the term of this patent is extended or adjusted under 35 U.S.C. 154(b) by 0 days.

(21) Appl. No.: 15/964,638

(22) Filed: Apr. 27, 2018

(65) Prior Publication Data
US 2019/0335226 A1 Oct. 31, 2019

(51) Int. Cl.
*H04N 7/173* (2011.01)
*H04N 21/437* (2011.01)
*H04N 21/61* (2011.01)
*H04L 12/28* (2006.01)

(52) U.S. Cl.
CPC ....... *H04N 21/437* (2013.01); *H04L 12/2801* (2013.01); *H04N 21/6118* (2013.01); *H04N 21/6168* (2013.01)

(58) Field of Classification Search
CPC . H04N 21/42676; H04B 3/50; H04L 43/0847
USPC ........................................................ 725/121
See application file for complete search history.

(56) References Cited

U.S. PATENT DOCUMENTS

2013/0004179 A1* 1/2013 Nielsen .................... H04B 3/50
   398/115
2018/0302121 A1* 10/2018 Poletti ................. H04L 43/0847

OTHER PUBLICATIONS

Society of Cable Telecommunications Engineers, Inc., Engineering Committee, Data Standards Subcommittee, "DOCSIS 3.1 Part 1: Physical Layer Specification", pp. 1-237 (2016) Exton, Pennsylvania.
CISCO, "Digital Transmission: Carrier-to-Noise Ratio, Signal-to-Noise Ratio, and Modulation Error Ratio", pp. 1-41. C11-378316-00 (Nov. 2006).

* cited by examiner

*Primary Examiner* — Jivka A Rabovianski
(74) *Attorney, Agent, or Firm* — DLA Piper LLP (US)

(57) ABSTRACT

A cable network test instrument for isolating a source of noise in a cable network system is disclosed.

20 Claims, 4 Drawing Sheets

US 10,924,799 B2

INSTRUMENT AND METHOD FOR PERFORMING A SWEEP FOR NOISE IN A CABLE NETWORK SYSTEM

TECHNICAL FIELD

The present disclosure relates generally to data-over-cable or cable network system testing, and, more particularly, to instruments and methods for detecting noise in a cable network system.

BACKGROUND

Most cable network systems are coaxial-based broadband access systems that may take the form of all-coax network systems, hybrid fiber coax (HFC) network systems, or RF over glass (RFOG) network systems. Cable network system designs typically use a tree-and-branch architecture that permits bi-directional data transmission, including Internet Protocol (IP) traffic between the cable system head-end and customer locations. There is a forward or downstream signal path (from the cable system head-end to the customer location) and a return or upstream signal path (from the customer location back to the cable system head-end). The upstream and the downstream signals occupy separate frequency bands. In the United States, the frequency range of the upstream band is from 5 MHz to 42 MHz, 5 MHz to 65 MHz, 5 MHz to 85 MHz, or 5 MHz to 200 MHz, while the downstream frequency band is positioned in a range above the upstream frequency band.

Customer locations may include, for example, cable network system (e.g., CATV) subscriber's premises. Typical signals coming from a subscriber's premises include, for example, set top box DVR/On Demand requests, test equipment data channels, and Internet Protocol output cable modem carriers defined by the Data Over Cable Service Interface Specification ("DOCSIS"), which is one communication standard for bidirectional data transport over a cable network system.

Because the subscriber's premises is not the property of the cable network operator and signals from many subscribers' premises on a particular node combine in the return band, the return path/upstream band of the cable network system is subject to significant noise, with every subscriber's premises acting like an antenna. Noise (ingress) that intrudes into the upstream band, which is typically called ingress, accumulates along the tree-and-branch architecture, as in a funnel, until it reaches the cable head-end. Sources of ingress include short wave radio signals, broadband noise generated by, for example, personal computers and electric motors, and impulse noise, which are very short bursts of broadband noise.

Technicians have typically used signal level meters to measure ingress. This is usually done by physically connecting the signal level meter to a test point in the cable network system and using spectral analysis and/or heat maps to locate noise in the return band spectrum. In some cases, technicians might attempt to analyze the Signal to Noise Ratio (SNR) or the Modulation Error Ratio (MER) at a test point. When these are low, the technicians might conclude that noise was introduced into the signal path before the test point. However, this approach fails to take into account the SNR or MER of the channel before it enters the coax portion of the network. Because of differences in modulators and within the headend network, some channels may have higher initial SNR or MER than others. Nor can the technician judge the amount of noise introduced by calculating differences in SNR or MER between test points, because the difference is substantially affected by the values before the signals enter the coax portion of the network.

SUMMARY

According to one aspect, a cable network test instrument is disclosed. The cable network test instrument comprises a port configured to be coupled to a node of a cable network system, and a controller electrically connected to the port. The controller is configured to access data on the cable network system via the port and includes circuitry configured to store a first set of signal data from the cable network system for a number of predefined frequencies over a first predetermined time interval. The circuitry is also configured to collect a second set of signal data from the cable network system through the port for the number of predefined frequencies over a second predetermined time interval and calculate, for each predefined frequency, a first average error ratio based on the first set of signal data and a second average error ratio based on the second set of signal data. The circuitry is also configured to determine, for each predefined frequency, a difference between the first and second average error ratios and generate a user-perceptible indication of the difference between the first average error ratio and the second average error ratio to detect and isolate a source of ingress noise. Each average error ratio at each predefined frequency is a ratio of average error power to average symbol power. Each predefined frequency may be associated with a channel in the upstream or downstream bands of the cable network system.

In some embodiments, the cable network test instrument may also comprise a display operable to present the user-perceptible indication of the difference between the first average error ratio and the second average error ratio to detect and isolate a source of ingress noise. In some embodiments, the user-perceptible indication may include a sweep across a frequency band including the predefined frequencies.

In some embodiments, the cable network test instrument may also comprise demodulation circuitry having an input coupled to the port and an output coupled to the controller. The demodulation circuitry may be configured to generate a number of Quadrature Amplitude Modulation (QAM) symbols from signal data received from the cable network system. The circuitry of the controller may be configured to calculate the first average error ratio and the second average error ratio for each predefined frequency based on the number of Quadrature Amplitude Modulation (QAM) symbols. In some embodiments, the demodulation circuitry is included in the controller.

In some embodiments, the demodulation circuitry may be configured to calculate a number of modulation error vectors for each predefined frequency based on the number of QAM symbols, and determine an average error power for the first and second average error ratios for each predefined frequency based on the calculated modulation error vectors.

In some embodiments, the controller may include circuitry configured to separately calculate each of a first average error power based on a first number of QAM symbols in the first set of signal data and the second average error power based on a second number of QAM symbols in the second set of signal data from the following equation:

$$\text{Average Error Power for a channel} = \Sigma_{j=1}^{N}[(I_j - \tilde{I}_j)^2 + (Q_j - \tilde{Q}_j)^2]$$

where:

N=the number of QAM symbols, $I_j$=the I or in-phase component of the j-th symbol received, $Q_j$=the Q or quadrature component of the j-th symbol received, $\tilde{I}_j$=the ideal I or in-phase component of the j-th symbol received, and $\tilde{Q}_j$=the ideal Q or quadrature component of the j-th symbol received.

In some embodiments, the controller may include circuitry configured to calculate the average symbol power for each of the first and second average error ratios for each predefined frequency from the following equation:

$$\text{Average Symbol Power for a channel} = \Sigma_{j=1}^{N}(\tilde{I}_j^2 + \tilde{Q}_j^2).$$

where:

$\tilde{I}_j$=the ideal I or in-phase component of the j-th symbol received, and $\tilde{Q}_j$=the ideal Q or quadrature component of the j-th symbol received.

In some embodiments, each predefined frequency may correspond to a channel of the cable network system.

In some embodiments, the circuitry of the controller may be further configured to collect the first set of signal data from the cable network system through the port over the first predetermined time interval. In some embodiments, the circuitry of the controller may be further configured to receive the first set of signal data from the cable network system through the port. Additionally, in some embodiments, the circuitry of the controller may be further configured to collect the second set of signal data from the cable network system based on a synchronization message received from the cable network system through the port.

According to another aspect, a method of detecting noise in a cable network system is disclosed. The method comprises connecting a cable network test instrument at a first node of the cable network system, operating the instrument at the first node to collect a first set of signal data from the cable network system for a number of predefined frequencies over a first predetermined time interval, connecting the instrument at a second node of the cable network system that is downstream from the first node, operating the instrument at the second node to collect a second set of signal data from the cable network system for a number of predefined frequencies over a second predetermined time interval, and operating the instrument to calculate, for each predefined frequency, a first average error ratio based on the first set of signal data and a second average error ratio based on the second set of signal data. The method further comprises operating the instrument to determine, for each predefined frequency, a difference between the first average error ratio and the second average error ratio, generating, with the instrument, a user-perceptible indication of the difference between the first and the second average error ratios, and identifying a source of noise based on the user-perceptible indication. In the method, each average error ratio at each predefined frequency is a ratio of average error power to average symbol power.

In some embodiments, generating the user-perceptible indication of the difference may include activating a display of the instrument to show the calculated difference at each predefined frequency. Additionally, in some embodiments, generating a user-perceptible indication may include activating display of the instrument to show the calculated difference on a plot of the calculated differences versus the predefined frequencies, and identifying the source of noise includes locating peaks in the plot of the calculated differences.

In some embodiments, each of the first set of signal data and the second set of signal data may include radio frequency signal data for a number of channels of the cable network system. Each channel may be located at one of the predefined frequencies.

In some embodiments, operating the instrument to calculate the first average error ratio and the second average error ratio may include demodulating the radio frequency signal data to generate a number of Quadrature Amplitude Modulation (QAM) symbols for the first set of signal data and the second set of signal data, operating the instrument to calculate a number of modulation error vectors for each carrier channel of the number of carrier channels based on the number of QAM symbols, and operating the instrument to obtain an average error power for the first and second average error ratios for each carrier channel based on the calculated modulation error vectors.

In some embodiments, operating the instrument to obtain the average error power may include separately calculating each of the first average error power and the second average error power from the following equation:

$$\text{Average Error Power for a channel} = \Sigma_{j=1}^{N}[(I_j - \tilde{I}_j)^2 + (Q_j - \tilde{Q}_j)^2]$$

where:

N=the number of QAM symbols, $I_j$=a I or in-phase component value of the j-th symbol received, $Q_j$=a Q or quadrature component value of the j-th symbol received, $\tilde{I}_j$=an ideal I or in-phase component value of the j-th symbol received, and $\tilde{Q}_j$=an ideal Q or quadrature component value of the j-th symbol received.

Additionally, in some embodiments, operating the meter to calculate the first average error ratio and the second average error ratio may include calculating the average symbol power for the first and second average error ratios for each carrier channel from the following equation:

$$\text{Average Symbol Power for a channel} = \Sigma_{j=1}^{N}(\tilde{I}_j^2 + \tilde{Q}_j^2).$$

where:

$\tilde{I}_j$=an ideal I or in-phase component value of the j-th symbol received, and $\tilde{Q}_j$=an ideal Q or quadrature component value of the j-th symbol received.

In some embodiments, the method may further comprise accessing a memory of the meter to obtain the ideal I or in-phase component values ($\tilde{I}_j$) and ideal Q or quadrature component values ($\tilde{Q}_j$).

In some embodiments, a carrier channel of the cable network system may be located at each predefined frequency.

According to another aspect, a system comprises a network device including a port configured to be coupled to a cable network system, and a controller electrically connected to the port. The controller is configured to access data on the cable network system via the port. The controller includes circuitry configured to store a first set of signal data from the cable network system for a number of predefined frequencies over a first predetermined time interval, collect a second set of signal data from the cable network system through the port for the number of predefined frequencies over a second predetermined time interval, calculate, for each predefined frequency, a first average error ratio based on the first set of signal data and a second average error ratio based on the second set of signal data, determine, for each predefined frequency, a difference between the first average error ratio and the second average error ratio, and generate a user-perceptible indication of the difference between the first average error ratio and the second average error ratio to detect and isolate a source of ingress noise. Each average error ratio at each predefined frequency is a ratio of average error power to average symbol power.

In some embodiments, the network device may further include a display operable to present the user-perceptible indication of the difference between the first average error ratio and the second average error ratio to detect and isolate a source of ingress noise.

BRIEF DESCRIPTION OF THE DRAWINGS

The detailed description particularly refers to the following figures, in which.

DETAILED DESCRIPTION OF THE DRAWINGS

Figure 1:
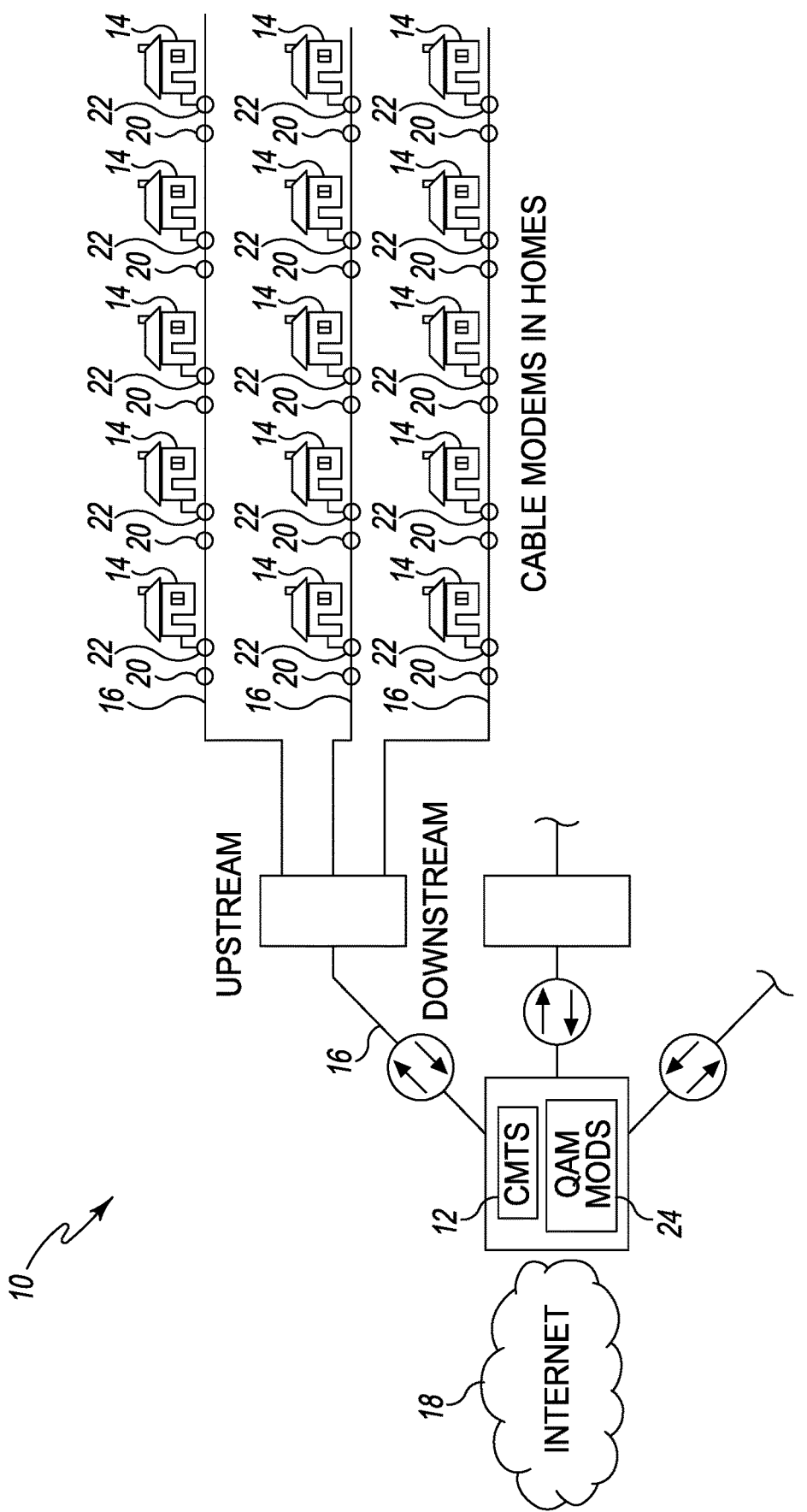
FIG. 1 is a diagram of a cable network system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

As shown in FIG. 1, a cable network system 10 includes a Cable Modem Termination System (hereinafter sometimes CMTS) 12 that may be located at a cable company's head end or local office. Ingress noise present in the cable network system 10 may be isolated using a test instrument 50 (see FIG. 2), which is configured to calculate average error ratios for channels of the cable network system 10 at a number of points throughout the system 10. As described in greater detail below, the test instrument 50 is configured to display the differences between the average error ratios across a sweep of channels (and hence across a number of predefined frequencies) to assist a technician in isolating and eliminating possible sources of ingress noise.

In the illustrative embodiment, the CMTS 12 obtains and modulates programming material onto appropriate carriers for distribution to cable modems 14 located at subscribers' premises. Subscribers' premises may include offices, homes, apartments, or other spaces at which CATV content is desired. In the illustrative embodiment, the carriers are combined for distribution downstream to subscribers over the forward path. Signals going upstream from subscribers' premises are routed in the return path.

The CMTS 12 is connected to the cable modems 14 via a plurality of data lines 16 such as, for example, coaxial cable and/or optical fiber that transport the CATV signals. In some embodiments, the CATV signals are transported as radio frequencies (RF). The signals may also be transported in hybrid systems including optical transmission portions in which the RF signals are converted to light for fiber optic transmission over some portions of the signal path and as RF signals over other portions of the signal path. The CMTS 12 also communicates with the other components of the cable network system 10 via the Internet 18. To do so, the CMTS 12 is configured to convert signals it receives from each cable modem 14 into Internet Protocol (IP) packets, which are then transmitted over the Internet 18. Transmissions from the cable modems 14 to the CMTS 12 are referred to as "upstream" transmissions or signals. The CMTS 12 is also configured to send signals "downstream" to the cable modems 14 by processing the signals it receives via the Internet 18 and then transmitting them to the cable modems 14.

The cable network system 10 also includes a number of nodes 20, 22. The nodes include a number of amplifiers 20 that are positioned throughout the cable network system 10 to compensate for signal loss caused by, for example, imperfections in the data lines or splitting of the signal during distribution. The cable network system 10 also includes a plurality of distribution taps 22 that provide points at which the subscribers' premises (and hence the cable modems 14) may be connected. In the illustrative embodiment, a single distribution tap 22 is connected to a single subscriber's premises via a coaxial cable. It should be appreciated that in other embodiments one or more of the taps may split the signals for distribution into two, four, or eight subscribers' premises.

As shown in FIG. 1, the cable network system 10 may also include one or more Quadrature Amplitude Modulation (QAM) modulators 24, which are located at the head end of the system 10 with the CMTS 12. Each modulator 24 is configured to generate downstream digital television signals, which are placed on the data lines 16 for distribution and use at the subscribers' premises.

The cable network system 10 may include any number of "upstream" and "downstream" channels and carriers within each channel to carry data over the data lines 16 between the CMTS 12 and the cable modems 14 on the system 10. Currently, cable network systems provide either four or eight active upstream channels, which are located at predefined frequencies, in the upstream frequency band. In some embodiments, there may be as many as 8192 upstream channels. The upstream band, like any other frequency band allocated for communication, is desired to have a minimal amount of interference, but external sources generate ingress noise that interferes with the upstream band. Such external sources include personal electronic devices such as computers, electric motors, cellular towers, and other sources outside of the cable network system 10. Cable network operators seek to locate and isolate such external sources to eliminate the interference and improve operation of the cable network system 10.

Figure 2:
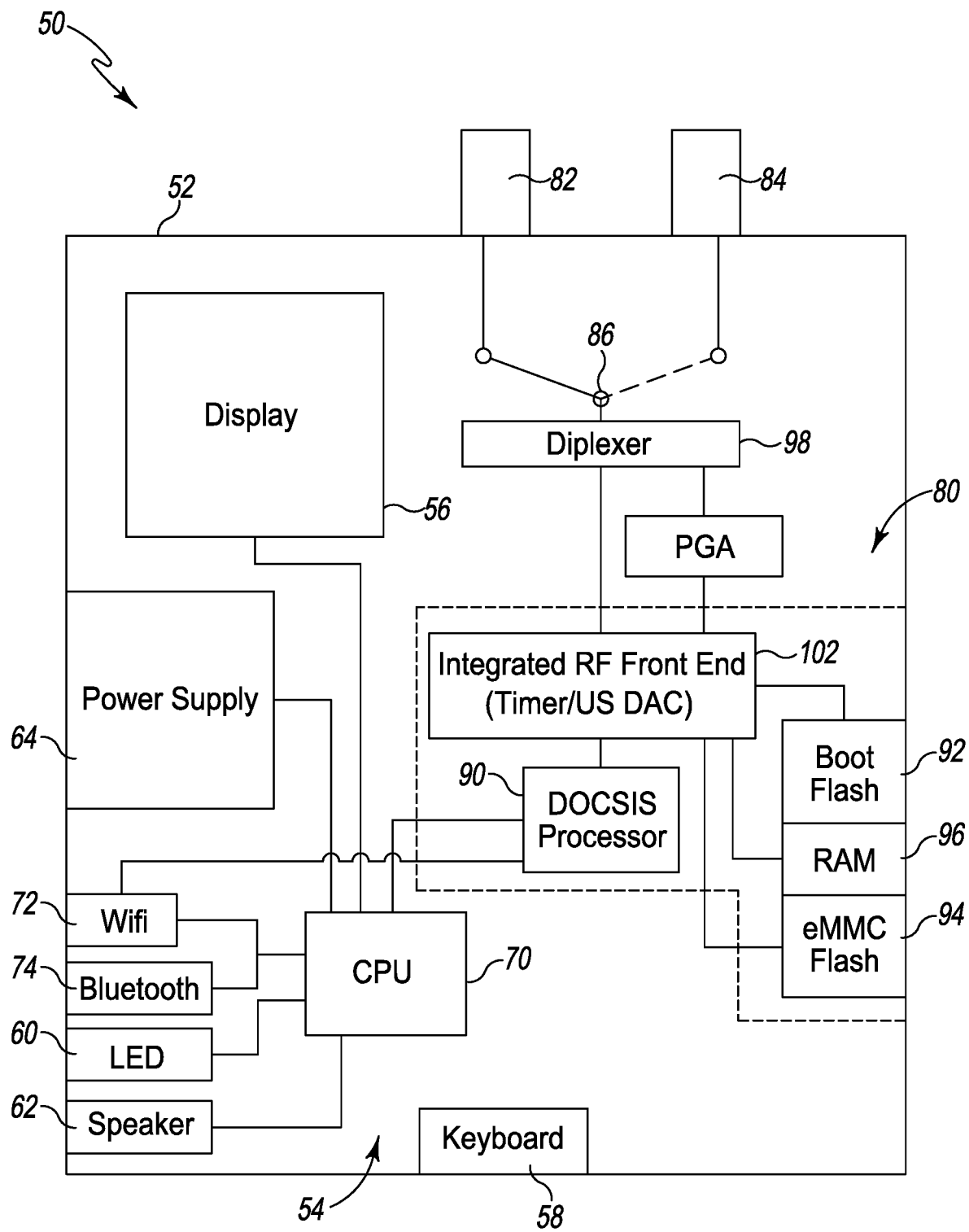
FIG. 2 is a simplified block diagram of a test instrument configured to isolate ingress noise in the cable network system of FIG. 1.

Referring now to FIG. 2, a test instrument 50 for use in locating or isolating noise in the cable network system 10 is shown. In the illustrative embodiment, the instrument 50 is configured to perform a sweep across a number of channels in the cable network system 10 to collect and process signal data associated with the channels to locate a source of noise using an average error ratio calculated for each channel, as described in greater detail below.

The test instrument 50 includes an outer casing 52 that houses electronic circuitry 54 configured to collect and process signal data from the cable network system 10. The test instrument 50 has a user interface that includes an integrated display 56, a keyboard 58, visual indicators (e.g., light-emitting diodes) 60 associated with different functions of the test instrument 50, and a speaker 62. In the illustrative embodiment, the integrated display 56 is a liquid crystal display.

The test instrument 50 also includes a power supply 64 configured to supply power to the other electronic circuitry 54. The power supply 64 may include a rechargeable battery pack mounted in the casing 52 and/or circuitry for connecting the test instrument 50 to a standard wall outlet.

The test instrument 50 also includes a central processing unit (CPU) 70, which is operable to selectively control the other electronic circuitry 54 of the test instrument 50. In the illustrative embodiment, the CPU 70 is a microprocessor configured to boot or power-up the circuitry required to collect and analyze signal data from the system 10. It should be appreciated that in other embodiments the CPU may take the form of a field programmable gate array (FPGA) or other electronic device configured to control the operation of the circuitry 54. In the illustrative embodiment, the CPU 70 is connected to the keyboard 58 to receive inputs from the technician and to the display 56 and indicators 60 to provide outputs and other information to the technician regarding the operation of the test instrument 50 and, for example, the data acquired during testing. Any measurements or other data collected by the test instrument 50 may be transmitted a monitoring system via a Wi-Fi transceiver 72 that is connected to the CPU 70. As shown in FIG. 2, the test instrument 50 includes a transceiver 74 operable to transmit and receive signals from a mobile device via the Bluetooth communications protocol.

The test instrument 50 also includes a DOCSIS engine or modem 80 operable to measure and evaluate signals in the system 10 via a pair of ports or connectors 82, 84. In the illustrative embodiment, the connectors 82, 84 are F-connectors configured to be connected to the coaxial cabling in the system 10. In that way, the instrument 50 may be connected at various points on the system 10 to collect data and isolate noise, as described in greater detail below. It should be appreciated that in other embodiments the test instrument 50 may include other input/output ports to connect the test instrument 50 to the system 10. In still other embodiments, the instrument 50 may utilize the transceiver 72 to access data on the system 10.

As shown in FIG. 2, the test instrument 50 includes a switch 86 operable to selectively connect the connectors 82, 84 to the DOCSIS modem 80. The switch 86 is connected to the CPU 70 such that it may be operated by the CPU 70 in response to user inputs. It should be appreciated that in other embodiments the instrument may include additional switches to permit both connectors to be connected to the DOCSIS modem 80 at the same time. In still other embodiments, the connectors may be connected directly to the modem 80.

The DOCSIS modem 80 includes a controller 90 that is connected to the CPU 70. In the illustrative embodiment, the controller 90 is a microprocessor such as, for example, a Puma 7 chip, which is commercially available from Intel Corporation. It should be appreciated that in other embodiments the controller may take the form of a field programmable gate array (FPGA) or other electronic device configured to process signals received from the system 10. In the illustrative embodiment, the CPU 70 and the controller 90 constitute the main electronic controller of the instrument 50 to operate the other circuitry 54 to collect and analyze data from the system 10. The modem 80 also includes in the illustrative embodiment a flash memory 92 for booting the microprocessor 90 and flash memory 94 and RAM memory 96 to support other operations of the DOCSIS modem 80. The flash memory 94 is illustratively eMMC, and the RAM memory 96 is illustratively DDR3. In some embodiments, the controller 90 may be configured to demodulate individual Quadrature Amplitude Modulation (QAM) digital television signals in the cable network system 10 and may include other circuitry to handle the differences in data encoding and decoding such signals.

As shown in FIG. 2, the modem 80 includes a diplexer circuit 98 configured to process signals received via F-connectors 82, 84. The modem 80 also includes a programmable gain amplifier (PGA) 100 that is operable to provide high transmission power required for the modem 80 and a digital to analog conversion (DAC) circuit 102 operable to convert the analog radio frequency signals received via the F-connectors 82, 84 to digital signals for use by the processor 90. To do so, the DAC circuit 102 is configured to tune the analog radio frequency signals and implement automatic gain control of those signals. The DAC circuit 102 also selects the channel and performs related functions to make individual QAM signals for the channels in the cable network system 10 available for further processing.

Figure 3:
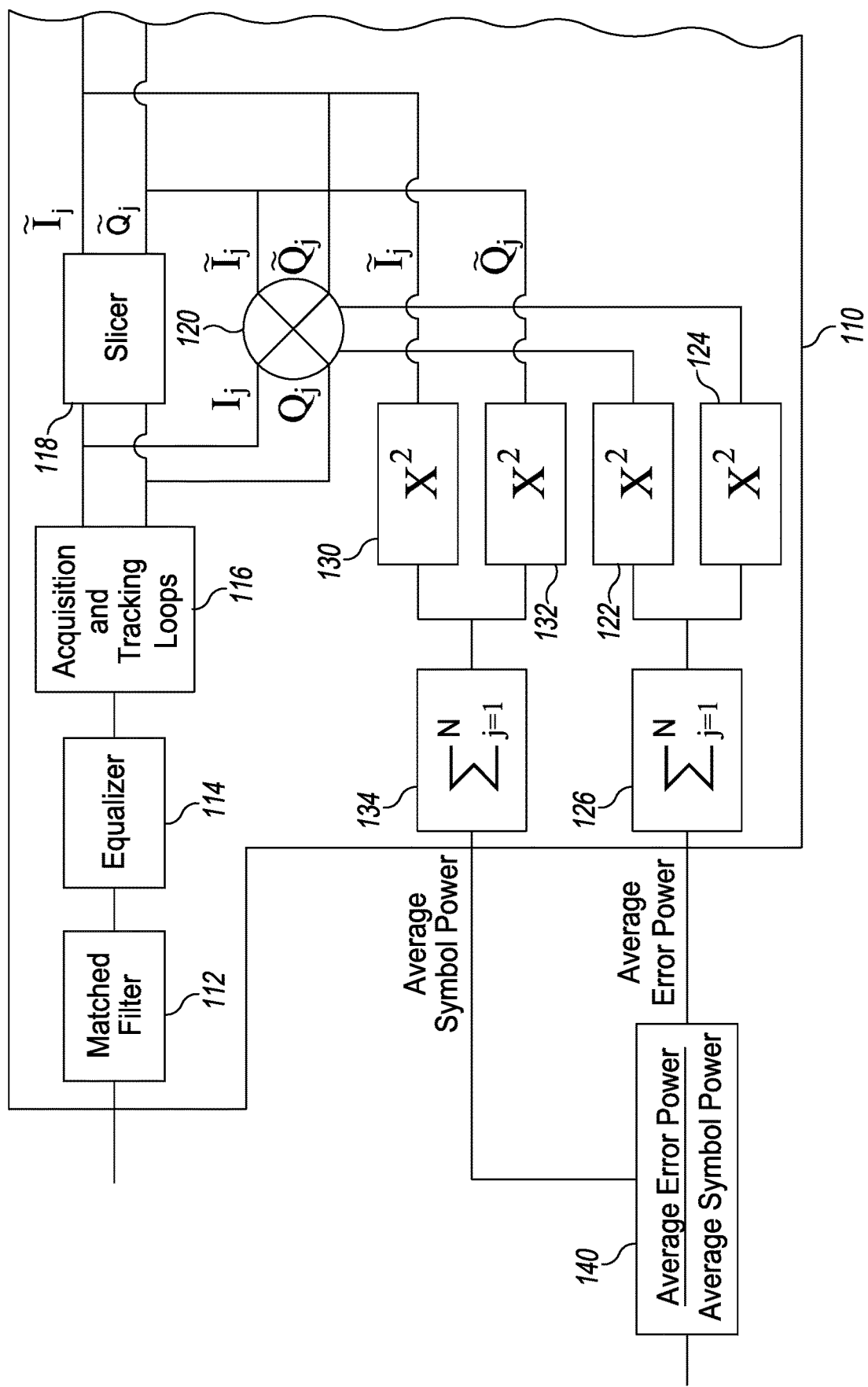
FIG. 3 is a simplified block diagram of a digital Quadrature Amplitude Modulation (QAM) demodulator and average error ratio calculator of the test instrument of FIG. 2.

The output of the DAC circuit 102 is provided to the processor 90 for demodulation. As shown in FIG. 3, the processor 90 includes a demodulation module 110 that demodulates the signals received from the DAC circuit 102 to obtain the QAM symbols from the data received from the cable network system 10. These QAM symbols are in a predefined frequency band that includes, for example, the upstream and downstream channels and are thereby associated with the channels (and hence the carriers) of the cable network system 10. The demodulation module 110 processes the data, obtains the QAM symbols, and calculates average error power and average symbol power for each channel of the cable network system 10.

In the illustrative embodiment, the demodulation module 110 of the processor 90 includes a matched input filter 112 that is matched to the output filter of the transmitter of the CMTS 12 or the digital television modulator(s) 24. In the illustrative embodiment, the filter 112 is a square-root Nyquist filter that has a response that is matched to the QAM symbol chip of the transmitter. The output of the filter 112 is coupled to the input of the equalizer 114. The equalizer 114 is configured to adapt its filter coefficients to dynamically vary the channel responses to maximize average symbol power.

The output of the equalizer 114 is coupled to acquisition and tracking loops calculator 116. The calculator 116 is configured to provide timing estimates to permit the demodulation module 110 to lock onto the signals received from the CMTS 12. The timing estimates include frequency, phase, and symbol timing. It should be appreciated that the calculator 116 may also be configured to use preamble symbols as a reference to aid in the acquisition and tracking of the signals. The calculator 116 may also be configured to remove in-channel narrowband interference before calculating the timing estimates.

The output of the calculator 116 is a number of QAM symbols, which are complex numbers or vectors. Each vector is represented by a magnitude ($I_j$) and a phase ($Q_j$).

The magnitude of the vector (also called "in-phase") is the real component of the complex number, and the phase of the vector (also called the quadrature) is the imaginary component of the complex number. The QAM symbols are provided to a slicer 118, which is configured to utilize the vectors and select the nearest ideal symbols from the QAM constellation. These ideal symbols may be stored in memory. In the illustrative embodiment, the ideal symbols include the ideal magnitude ($\tilde{I}_j$) of the vector and the ideal phase ($\tilde{Q}_j$) of the vector. The output of the slicer 118 is provided to junction 120.

As shown in FIG. 3, the junction 120 receives the magnitude ($I_j$) and phase ($Q_j$) of the vector and the ideal magnitude ($\tilde{I}_j$) and ideal phase ($\tilde{Q}_j$) of the vector. In junction 120, the demodulation module 110 is configured to subtract the ideal magnitude ($\tilde{I}_j$) from the magnitude ($I_j$) of the vector. The difference between the magnitudes is provided to block 122 in which the difference is squared.

Similarly, the demodulation module 110 is also configured to subtract the ideal phase ($\tilde{Q}_j$) from the phase ($Q_j$) of the vector in junction 120. The difference between the phases is provided to block 124 in which the difference is squared. As shown in FIG. 3, the squared magnitudes and squared phases are provided to block 126 and averaged or accumulated over the number of QAM symbols received from the loop calculator 116. The output of block 126 is the average error power of a channel of the cable network system 10.

In that way, the demodulation module 110 is configured to calculate the average error power for each channel from the following equation:

$$\Sigma_{j=1}^{N}[(I_j-\tilde{I}_j)^2+(Q_j-\tilde{Q}_j)^2]$$

where:
N=the number of QAM symbols,
$I_j$=the I or in-phase component of the j-th symbol received,
$Q_j$=the Q or quadrature component of the j-th symbol received,
$\tilde{I}_j$=the ideal I or in-phase component of the j-th symbol received, and
$\tilde{Q}_j$=the ideal Q or quadrature component of the j-th symbol received.

The ideal magnitude ($\tilde{I}_j$) of the vector and the ideal phase ($\tilde{Q}_j$) of the vector determined by the slicer 118 are also provided to blocks 130, 132. In blocks 130, 132, the demodulation module 110 squares each of the ideal magnitude ($\tilde{I}_j$) and the ideal phase ($\tilde{Q}_j$). The squares are provided to block 134, which averages or accumulates the squares of the ideal magnitude ($\tilde{I}_j$) and the ideal phase ($\tilde{Q}_j$) over the number of QAM symbols received from the loop calculator 116. The output of block 134 is the average symbol power of a channel of the cable network system 10. In that way, the demodulation module 110 is configured to calculate the average symbol power for each channel from the following equation:

$$\Sigma_{j=1}^{N}(\tilde{I}_j^2+\tilde{Q}_j^2).$$

where:
N=the number of QAM symbols,
$\tilde{I}_j$=the ideal I or in-phase component of the j-th symbol received, and
$\tilde{Q}_j$=the ideal Q or quadrature component of the j-th symbol received.

The processor 90 is configured to provide the average error power for a channel and the average symbol power for the same channel to the module 140. In the module 140, the processor 90 calculates a ratio between the average error power and the average symbol power for a channel of the cable network system 10. In other words, this ratio is the average error ratio of one of the channels of the cable network system 10. The processor 90 is also configured to calculate the average error ratio for each channel (and therefore each predefined frequency) detected in the signal data received from the cable network system 10. In that way, the processor 90 is configured to perform a sweep across the channels of the cable network system 10 to determine the average error ratio for each channel. The processor 90 is configured to provide this information to other electronic circuitry 54 in the instrument 50, including the CPU 70, for, for example, storage, display, or other processing, as described in greater detail below.

Figure 4:
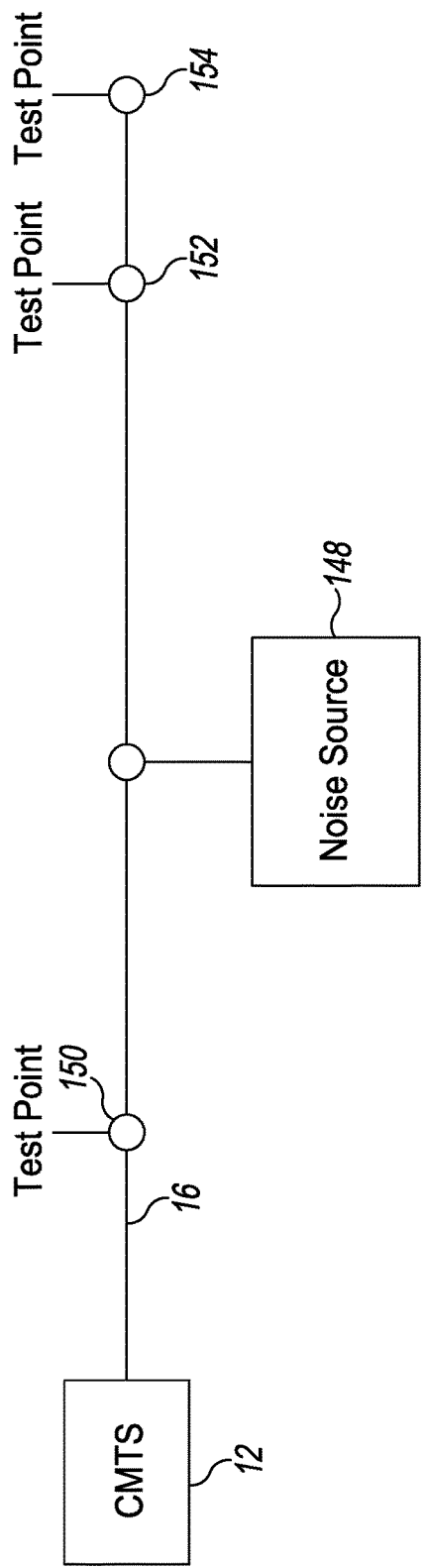
FIG. 4 is a simplified illustration of a test sequence for isolating ingress noise in the cable network system of FIG. 1 using the test instrument of FIG. 2.

As described above, the test instrument 50 is configured for use in locating or isolating in the cable network system 10. Referring now to FIG. 4, an exemplary test sequence that utilizes the test instrument 50 to isolate an unknown noise source 148. As described above, the cable network system 10 includes the CMTS 12, which generates and transmits programming material. A technician may connect one of the ports 82, 84 to a node 150 of the cable network system 10 located downstream of the CMTS 12 via a coaxial cable. The technician may then operate the test instrument 50 to collect signal data from the cable network system 10 as it passes through the node 150. To do so, the technician may utilize the keyboard 58 to energize the electronic circuitry 54 of the instrument 50 to collect signal data over a predetermined time interval. The time interval may be in a range of 5 to 10 seconds. The signal data is collected in a sweep across all of the relevant frequencies of the cable network system 10. In some embodiments, the relevant frequencies may include only the frequencies associated with the upstream channels; in other embodiments, the signals may include, for example, the frequencies may include all of the frequencies associated with the upstream and downstream channels. After the signal data is collected at the node 150, the technician may move downstream to connect to another node 152.

The technician may then operate the test instrument 50 to collect signal data from the cable network system 10 as it passes through the node 152, again utilizing, for example, the keyboard 58 to energize the electronic circuitry 54 of the instrument 50 to collect signal data over the predetermined time interval. At the node 152, the signal data again is collected in a sweep that matches the frequencies covered in sweep performed at the node 150.

As described above, the test instrument 50 is configured to demodulate the signal data collected at the nodes 150, 152 to obtain the QAM symbols for each channel in each set of signal data. The test instrument 50 is further configured to process the QAM symbols to calculate the average error power and the average symbol power for each channel at each node 150, 152. In other words, the technician may operate the test instrument 50 to obtain from the signal data collected at node 150 the average error power and the average symbol power for each channel at node 150. The technician may also operate the test instrument 50 to obtain from the signal data collected at node 152 the average error power and the average symbol power for each channel at node 152.

With the average error power and average symbol power for each channel at each node 150, 152, the technician may operate the test instrument 50 to obtain an average error ratio for each channel at each node 150, 152. The technician may then operate the test instrument 50 to find the difference between the average error ratio for each channel at the node 150 and the average error ratio for each channel at the node 152, which may be displayed as a sweep across the relevant frequency band on the display 56.

Figure 5:
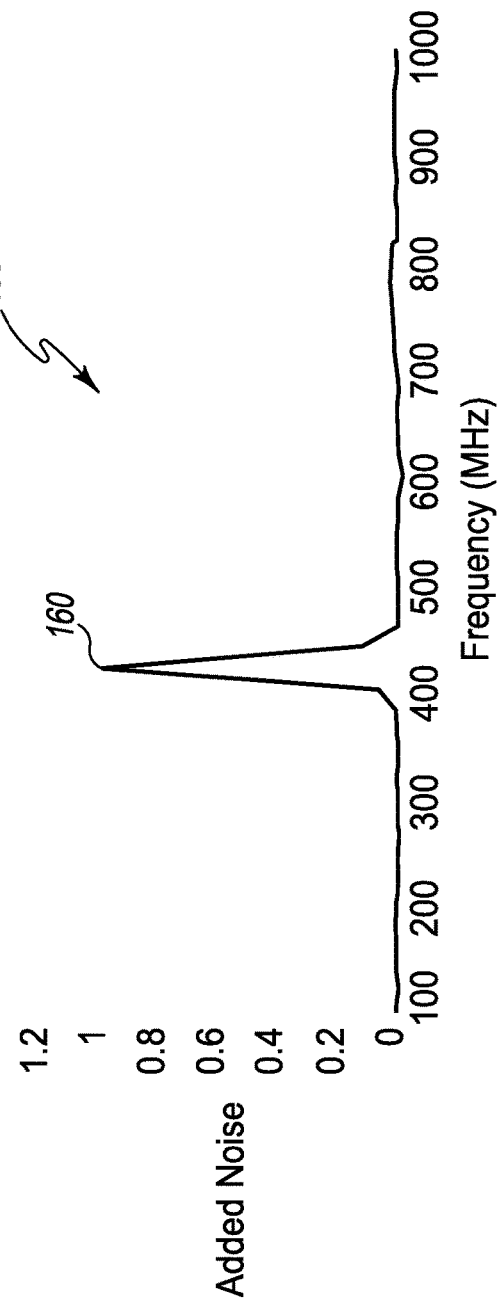
FIG. 5 is an exemplary view of a display of the test instrument of FIG. 2 showing ingress noise present during the test sequence of FIG. 4.

As shown in FIG. 5, the display 56 may include a graph 158 showing the calculated average error ratios plotted across the relevant frequency band. In the illustrative embodiment, the technician may identify the noise source 148 from the peak 160 shown on the display 56 between 400 and 500 MHz. In that way, the test instrument 50 is configured to provide a user-perceptible indication of the source of noise. With this information, the technician may determine that the noise source 148 is located between the nodes 150, 152, and the technician may then use typical diagnostic techniques to locate and eliminate the noise.

Returning to FIG. 4, the technician might begin his investigation at another node such as, for example, a node 154. Similar to the approach described above, the technician may collect signal data at the node 154 and then move upstream to the node 152. The technician may then operate the test instrument 50 to find the difference between the average error ratio for each channel at the node 154 and the average error ratio for each channel at the node 152. Because no noise source is present between the nodes 152, 154, no peaks would be present on the plot of the differences between the average error ratios on the display 56. The technician would then know that any source of noise is likely upstream of the nodes 152, 154 and move upstream to the node 150, where the technician would operate the instrument 50 to collect more signal data and calculate the average error ratio for each channel at the node 150. The technician may then operate the test instrument 50 to find the difference between the average error ratio for each channel at the node 150 and the average error ratio for each channel at the node 152 to then locate the noise source 148 as described above.

It should be appreciated that in other embodiments multiple test instruments 50 may be used to locate a source of noise. In such embodiments, one instrument 50 may be attached at, for example, each of the nodes 150, 152, 154 at the same time. The instrument 50 at the node 150 may then be operated to transmit synchronization messages to the instruments 50 at the other nodes 152, 154 to collect signal data at the same time for the same length of time and across the same predefined frequency band. The collected signal data may be sent to any of the instruments 50 or to a remote site for processing to calculate the differences in the average error ratios to isolate the noise source 148. The test instrument 50 described above constitutes a network device but it should be appreciated that in still other embodiments, other network devices such as, for example, cable modems, including the demodulation module 110 and the average error ratio module 140 and distributed throughout the cable network system 10, may be used to collect the signal data for use in calculating the differences in the average error ratios to isolate the noise source 148.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:
1. A cable network test instrument, comprising:
    a port configured to be coupled to a node of a cable network system, and
    a controller electrically connected to the port, the controller being configured to access data on the cable network system via the port,
    wherein the controller includes circuitry configured to:
        store a first set of signal data from the cable network system for predefined frequencies over a first predetermined time interval,
        collect a second set of signal data from the cable network system through the port for the predefined frequencies over a second predetermined time interval,
        calculate, for each predefined frequency, a first average error ratio based on the first set of signal data and a second average error ratio based on the second set of signal data,
        determine, for each predefined frequency, a difference between the first and second average error ratios, and
        generate a user-perceptible indication of the difference between the first average error ratio and the second average error ratio,
    wherein:
        each set of signal data comprises Quadrature Amplitude Modulation (QAM) symbols with in-phase components and quadrature-phase components,
        each average error ratio at each predefined frequency is a ratio of average error power to average symbol power, and
        both the first set of signal data and the second set of signal data are for the same predefined frequencies.

2. The cable network test instrument of claim 1, further comprising a display operable to present the user-perceptible indication of the difference between the first average error ratio and the second average error ratio.

3. The cable network test instrument of claim 1, further comprising:
    demodulation circuitry having an input coupled to the port and an output coupled to the controller, the demodulation circuitry being configured to generate a number of QAM symbols from signal data received from the cable network system,
    wherein the circuitry is configured to calculate the first average error ratio and the second average error ratio for each predefined frequency based on the number of QAM symbols,
        calculate a number of modulation error vectors for each predefined frequency based on the number of QAM symbols, and
        determine an average error power for the first and second average error ratios for each predefined frequency based on the calculated modulation error vectors.

4. The cable network test instrument of claim 1, wherein the controller includes circuitry configured to separately calculate each of a first average error power based on a first number of QAM symbols in the first set of signal data and the second average error power based on a second number of QAM symbols in the second set of signal data from the following mathematical expression:

$$\Sigma_{j=1}^{N}[(I_j-\tilde{I}_j)^2+(Q_j-\tilde{Q}_j)^2]$$

where:
N=the number of QAM symbols,
$I_j$=the I or in-phase component of the j-th symbol received,
$Q_j$=the Q or quadrature component of the j-th symbol received,
$\tilde{I}_j$=the ideal I or in-phase component of the j-th symbol received, and
$\tilde{Q}_j$=the ideal Q or quadrature component of the j-th symbol received.

5. The cable network test instrument of claim 4, wherein the controller includes circuitry configured to calculate the average symbol power for the first and second average error ratios for each predefined frequency from the following mathematical expression:

$$\Sigma_{j=1}^{N}(\tilde{I}_j^2+\tilde{Q}_j^2).$$

6. The cable network test instrument of claim 1, wherein each predefined frequency corresponds to a channel of the cable network system.

7. The cable network test instrument of claim 1, wherein the circuitry of the controller is further configured to collect the first set of signal data from the cable network system through the port over the first predetermined time interval.

8. The cable network test instrument of claim 1, wherein the circuitry of the controller is further configured to receive the first set of signal data from the cable network system through the port.

9. The cable network test instrument of claim 8, wherein the circuitry of the controller is further configured to collect the second set of signal data from the cable network system based on a synchronization message received from the cable network system through the port.

10. A method of detecting noise in a cable network system, the method comprising:
connecting a cable network test instrument at a first node of the cable network system,
operating the instrument at the first node to collect a first set of signal data from the cable network system for predefined frequencies over a first predetermined time interval,
connecting the instrument at a second node of the cable network system that is downstream from the first node,
operating the instrument at the second node to collect a second set of signal data from the cable network system for predefined frequencies over a second predetermined time interval,
operating the instrument to calculate, for each predefined frequency, a first average error ratio based on the first set of signal data and a second average error ratio based on the second set of signal data,
operating the instrument to determine, for each predefined frequency, a difference between the first average error ratio and the second average error ratio,
generating, with the instrument, a user-perceptible indication of the difference between the first and the second average error ratios, and
identifying a source of noise based on the user-perceptible indication,
wherein:
each set of signal data comprises Quadrature Amplitude Modulation (QAM) symbols with in-phase components and quadrature-phase components,
each average error ratio at each predefined frequency is a ratio of average error power to average symbol power, and
both the first set of signal data and the second set of signal data are for the same predefined frequencies.

11. The method of claim 10, generating the user-perceptible indication of the difference includes activating a display of the instrument to show the calculated difference at each predefined frequency.

12. The method of claim 10, wherein:
generating a user-perceptible indication includes activating display of the instrument to show the calculated difference on a plot of the calculated differences versus the predefined frequencies, and
identifying the source of noise includes locating peaks in the plot of the calculated differences.

13. The method of claim 10, wherein each of the first set of signal data and the second set of signal data includes radio frequency signal data for a number of channels of the cable network system, each carrier channel being located at one of the predefined frequencies.

14. The method of claim 13, wherein operating the instrument to calculate the first average error ratio and the second average error ratio includes:
demodulating the radio frequency signal data to generate a number of QAM symbols for the first set of signal data and the second set of signal data,
operating the instrument to calculate a number of modulation error vectors for each carrier channel of the number of carrier channels based on the number of QAM symbols, and
operating the instrument to obtain an average error power for the first and second average error ratios for each carrier channel based on the calculated modulation error vectors.

15. The method of claim 14, wherein operating the instrument to obtain the average error power includes separately calculating each of the first average error power and the second average error power from the following mathematical expression:

$$\Sigma_{j=1}^{N}[(I_j-\tilde{I}_j)^2+(Q_j-\tilde{Q}_j)^2]$$

where:
N=the number of QAM symbols,
$I_j$=a I or in-phase component value of the j-th symbol received,
$Q_j$=a Q or quadrature component value of the j-th symbol received,
$\tilde{I}_j$=an ideal I or in-phase component value of the j-th symbol received, and
$\tilde{Q}_j$=an ideal Q or quadrature component value of the j-th symbol received.

16. The method of claim 15, wherein operating the meter to calculate the first average error ratio and the second average error ratio includes calculating the average symbol power for the first and second average error ratios for each carrier channel from the following mathematical expression:

$$\Sigma_{j=1}^{N}(\tilde{I}_j^2+\tilde{Q}_j^2).$$

17. The method of claim 16, further comprising accessing a memory of the meter to obtain the ideal I or in-phase component values ($\tilde{I}_j$) and ideal Q or quadrature component values ($\tilde{Q}_j$).

18. The method of claim 10, wherein a carrier channel of the cable network system is located at each predefined frequency.

19. A system comprising:

a network device including a port configured to be coupled to a cable network system, and a controller electrically connected to the port, the controller being configured to access data on the cable network system via the port, wherein the controller includes circuitry configured to:

store a first set of signal data from the cable network system for predefined frequencies over a first predetermined time interval, collect a second set of signal data from the cable network system through the port for the predefined frequencies over a second predetermined time interval, calculate, for each predefined frequency, a first average error ratio based on the first set of signal data and a second average error ratio based on the second set of signal data, determine, for each predefined frequency, a difference between the first average error ratio and the second average error ratio, and generate a user-perceptible indication of the difference between the first average error ratio and the second average error ratio, wherein:

each set of signal data comprises Quadrature Amplitude Modulation (QAM) symbols with in-phase components and quadrature-phase components, each average error ratio at each predefined frequency is a ratio of average error power to average symbol power, the average error power is a sum of first squared deviations of the in-phase components and ideal in-phase components and second squared deviations of the quadrature-phase components and ideal quadrature phase components, and both the first set of signal data and the second set of signal data are for the same predefined frequencies.

20. The system of claim 19, wherein the network device further includes a display operable to present the user-perceptible indication of the difference between the first average error ratio and the second average error ratio to detect and isolate a source of ingress noise.

* * * * *